Feb. 1, 1938.　　W. J. F. FORWARD　　2,106,836
MACHINE TOOL
Filed May 28, 1937　　3 Sheets-Sheet 1

INVENTOR.
Worthy J. F. Forward
BY Harold R. Stonebraker
his ATTORNEY.

Feb. 1, 1938. W. J. F. FORWARD 2,106,836
MACHINE TOOL
Filed May 28, 1937 3 Sheets-Sheet 2
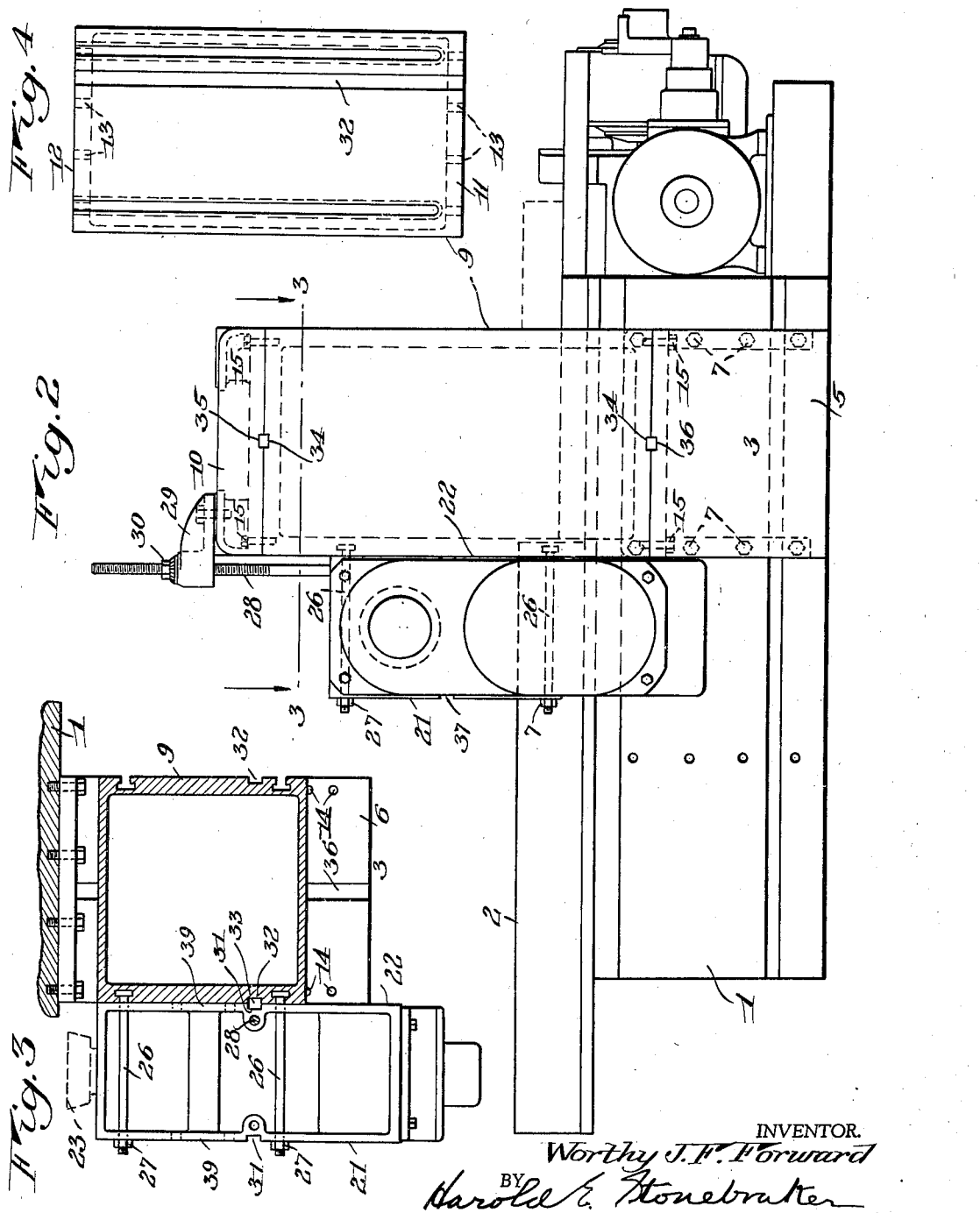

Feb. 1, 1938.   W. J. F. FORWARD   2,106,836
MACHINE TOOL
Filed May 28, 1937   3 Sheets-Sheet 3

Fig. 5

INVENTOR.
Worthy J. F. Forward
BY Harold E. Stonebraker,
his ATTORNEY.

Patented Feb. 1, 1938

2,106,836

UNITED STATES PATENT OFFICE 2,106,836

MACHINE TOOL

Worthy J. F. Forward, Rochester, N. Y., assignor to Consolidated Machine Tool Corporation, Rochester, N. Y., a corporation of Delaware Application May 28, 1937, Serial No. 145,313

12 Claims. (Cl. 90—18)

This invention relates to a machine tool, and has for its purpose to afford a self-contained tool head that is particularly applicable to milling machine structures.

A more particular object of the invention is to provide a tool head of such design as to make it reversibly positionable on a support, and susceptible of universal application in relation to a work table and the work thereon.

An additional purpose of the improvement is to afford a tool head embracing a housing that is symmetrically constructed on opposite sides, to permit the tool head to be attached with either side against a supporting member, and making it possible to position the tool head on either face of an upright, or disposed between and anchored to spacing members above and below the tool head and in this way constituting a rigid part of a machine frame and being tied between the top and bottom portions of the frame.

Still another object of the invention is to provide a machine including base members or wings adjustably attachable to a bed and adapted to receive adjustable uprights on which the tool head may be secured in any desired relation, or adjustable spacing members adapted to receive a tool head thereon in horizontal arrangement, in which case the tool head is anchored between spacing members above and below the same, or between a base member and a top cross-tie member and forms practically an integral part of the frame of the machine instead of being bolted to the front or back of an upright or column.

To these and other ends, the invention consists in the arrangement and construction of parts that will appear clearly from the following description when read in conjunction with the accompanying drawings, the novel features being pointed out in the claims following the specification.

In the drawings:

Fig. 2 is a side elevation of the same;

Fig. 3 is a horizontal sectional view on the line 3—3 of Fig. 2 looking in the direction indicated;

Fig. 4 is a front elevation of one of the uprights or columns, and

Fig. 5 is an end elevation illustrative of one of many other applications of the invention, with the tool heads arranged horizontally at the sides and vertically at the top and constituting a rigid built-in part of the frame of the machine.

Figure 1:
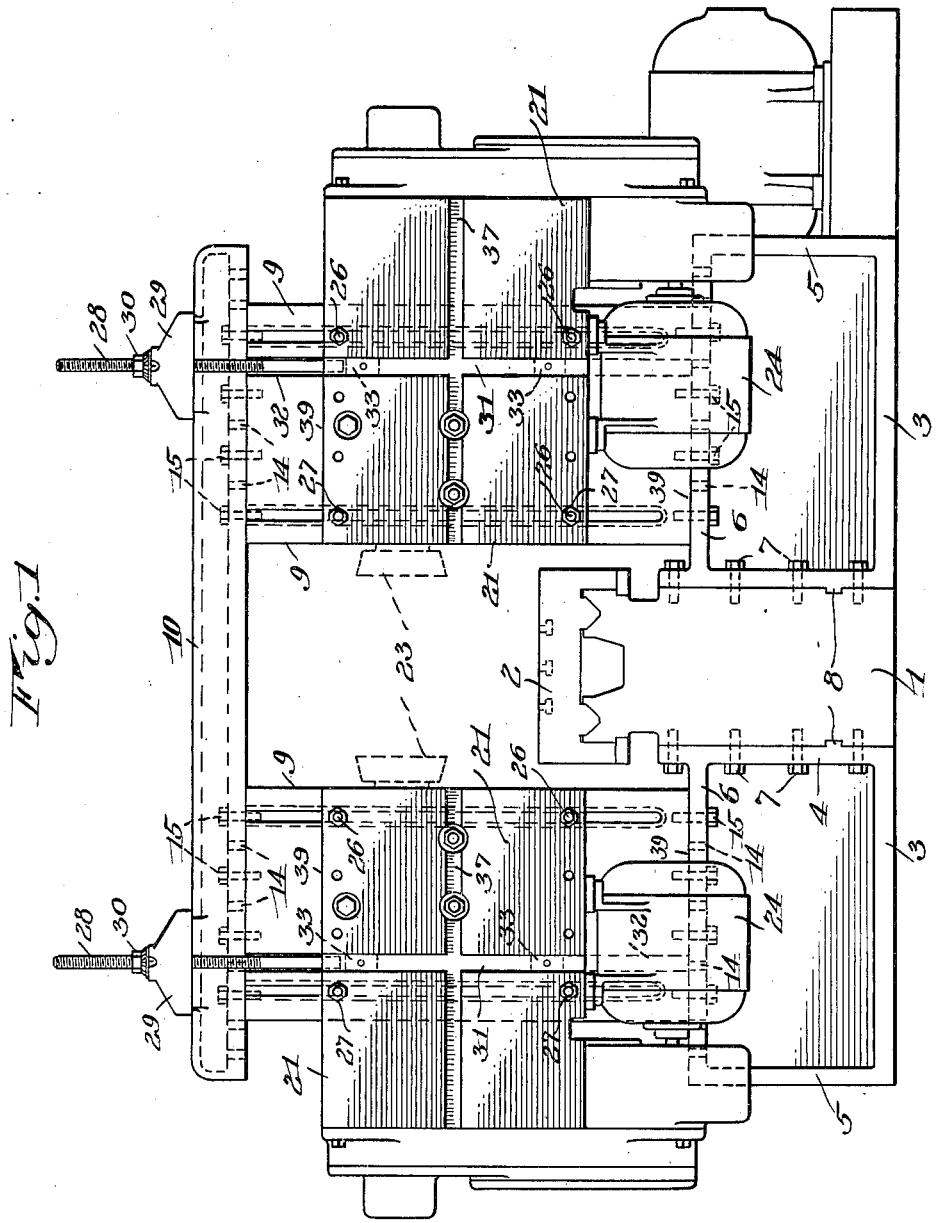
Fig. 1 is an end elevation of a milling machine showing a preferred embodiment of the invention, and with a pair of such tool heads mounted each upon one face of an upright, the uprights or columns being anchored at the bottom and connected at the top.

Referring more particularly to the drawings, in which like reference characters refer to the same parts throughout the several views, and to Fig. 1, I designates the stationary bed of the machine upon which is arranged for the usual reciprocatory movement the work table 2, and located at each side of the bed is a base member or wing including a bottom 3, inner side wall 4, outer side wall 5, and top 6.

The inner side wall 4 is provided with a series of openings arranged for cooperation with corresponding series of openings arranged at intervals along the side of the bed, and 7 designate bolts or other suitable attaching means for securing the base member or wing fixedly to the bed 1 after it is adjusted longitudinally to the selected position for supporting the tool head. The inner side wall of the base member or wing is also provided with a longitudinally extending tongue 8 which cooperates with a corresponding longitudinal groove in the side wall of the base 1 to lock these parts against relative vertical movement when the bolts 7 are secured in place.

9 designates each of a pair of uprights or columns adjustably secured to the top 6 of the base member, and connected together at the top by a suitable cross-member 10. To accomplish this, each upright 9 includes horizontal walls 11 and 12 at the bottom and top thereof, see Fig. 4, provided with openings 13 for cooperation with openings 14 in the top of the base member or wing and in the cross-tie member 10, while 15 designate bolts or other attaching means for securing the upright or column in selected position on the top 6 of the base member and anchoring it thereto as well as to the cross-member 10 at the top.

In the structure shown in Fig. 1, there is a tool head mounted upon the front face of each upright or column 9, each tool head comprising a housing having oppositely arranged flat symmetrical attaching surfaces or sides 21 and 22, see Fig. 3, while 23 designates the rotary tool or cutter preferably disposed intermediate the opposite symmetrical surfaces 21 and 22, and driven by an electric motor 24 attached to and carried by one of the bottom walls of the housing, as viewed in Fig. 1.

The motor 24 operates the tool 23 through a suitable train of gears within the housing, such gearing forming the subject matter of a copending application, filed May 28, 1937, Serial No. 145,312, and unnecessary to disclose here, it being understood that this invention contemplates any relation between the cutter and motor, and any gearing, as long as the opposite sides of the housing are symmetrical or selectively attachable to a support member, to permit reversibility and universal application of the housing.

Referring to Fig. 3, the tool head is held in place on the upright or column by means of the tie members or bolts 26 slidable on the upright as shown, and extending through the opposite walls of the housing, which is locked against the upright by the nuts 27. The tool head is adjustable vertically with relation to the column through any suitable adjusting means such as a rod 28 which is fixedly connected to the tool head and extends upwardly through a bracket 29, the upper end of the rod being threaded and engaged by an adjusting nut 30. In order to aline the tool head properly with the upright or column, and to prevent any relative lateral movements, the tool head is provided with keyways 31 in its opposite side walls, and 32 is a cooperating keyway extending vertically of the upright and adapted to receive suitable keys 33 engaging said opposite keyways in the upright and tool head housing.

It will be observed that both of the opposite flat sides 21 and 22 of the tool head housing are provided with keyways 31 and adapted to receive the adjusting rods 28, and consequently either side of the tool head may be attached to the upright or column, thus making it possible to reverse the position of the tool heads shown in Fig. 1, with their front sides secured against the faces of the uprights or column, and also each tool head may be adjustably attached upon either the front or back face of an upright or column, the latter being constructed so as to receive a tool head in either of such positions, as shown in Fig. 3.

The upright is also provided with keyways 34 in the top and bottom thereof, see Fig. 2, to receive keys which interlock with cooperating keyways 35 and 36 in the cross-tie member 10 and base 3 respectively so as to permit the necessary adjustment of the upright toward and from the bed and work table while maintaining it properly alined with the base and with the cross-tie member at the top.

Each tool head is also provided with keyways 37 arranged transversely to and intersecting the aforementioned keyways 31 and adapted to cooperate with a key interlocking with the keyways 36 in the base member when the tool head is positioned horizontally on the base, to permit adjustment of the tool head toward and from the work table, or the tool head may be arranged upon a spacing block or frame member such as indicated at 38, see Fig. 5, which in turn is adjustably secured to the base member 3.

In this arrangement, the tool head is positionable horizontally and forms a rigid part of the machine frame, or upright portion, instead of being attached to a surface of a column, affording a considerably more rigid mounting and resulting in greater speed and efficiency for certain classes of work. To permit this, the tool head has suitable openings provided in flanges 39 adjacent to the edges of its side walls, to receive bolt members 40 extending through corresponding openings in the spacing block or frame member 38, which is also provided with keyways to receive keys for cooperation with the aforementioned keyways 36 in the base and keyways 37 in the tool head.

Positioned above the tool head is arranged another spacing block or frame member 41 similarly bolted thereto, and attached to the top spacing blocks or frame members 41 there may be secured a cross-tie member such as shown in Fig. 1, or if desirable to use additional tool heads for operation on the top surface of the work, angular spacing elements or frame members 42 are attached to the spacing blocks 41 and between the spacing elements 42 there may be arranged a pair of tool heads similar to the one already described, these being bolted to each other as shown, and also bolted to the adjacent spacing elements or frame members 42.

With this arrangement, there is a rigid and continuous frame from both sides of the bed, tied thereto and extending upwardly on either side and across the top, the tool heads forming a rigid part of such frame. This construction of tool head lends itself to mounting the tool head in any desired position to form an integral part of such a frame either at the side or top thereof, or it may with equal facility be positioned upon either the front or back face of an upright or column forming a part of such a frame, or if desired, it may be secured in horizontal position upon a base, frame member, or spacing block, or to the front or back face of an upright or column independently of a complete frame, where the work is of such a character as to make an encircling frame undesirable or unnecessary, and it is a feature of the invention that the tool head is of universal application, making it possible with a series of such tool heads, base members, frame members, and uprights, to build together, by adjustably securing the parts, a machine of any type or form adapted to the various styles of work required of a milling machine or other machine tool.

While the invention has been described with reference to particular structural embodiments, it is not confined to the detailed arrangements herein disclosed, and this application is intended to cover such other modifications, changes, or adaptations as may come within the purposes of the improvements or the scope of the following claims.

I claim:

1. In a machine tool including a work table and a tool head support, a tool head removably attachable to the support and including a housing having opposite flat sides which are symmetrical and provided with intersecting keyways for cooperation with keys and keyways upon either vertical or horizontal supports, permitting the head to be reversibly attached to a vertical support or to be interposed horizontally between portions of a frame.

2. In a machine tool including a work table and a tool head support, a tool head removably attachable to the support and including a housing having opposite flat sides which are symmetrical permitting the housing to be positioned horizontally on the support, and a superposed frame member, the tool head thus constituting a part of the vertical framework of the machine.

3. In a machine tool including a work table and a tool head support, a tool head removably positionable on the support and including a housing having opposite flat sides provided with intersecting keyways for cooperation with keys and keyways on a vertical support on which the head is adjustable upwardly and downwardly or upon a horizontal support on which the head is adjustable toward and from the table.

4. In a machine tool including a work table and a tool head support, a tool head removably attachable to the support and including a housing having oppositely arranged flat attaching surfaces adapted to be selectively secured to a support or to be secured between members of a frame, said opposite attaching surfaces having intersecting keyways to receive interlocking keys for cooperation with cooperating keyways on said support or frame members.

5. In a machine tool including a work table and a tool head support, a tool head removably attachable to the support and including a housing of generally rectangular formation with opposite flat symmetrical attaching surfaces which are selectively attachable to a support or positionable between and attachable to members of a machine frame.

6. In a machine tool including a work table and a tool head support, a bed, a base adjustably attachable to the bed, the top surface of said base being provided with means for attaching thereto an upright or a frame member in adjustably spaced relation to the bed, and a tool head reversibly attachable to said upright or to said frame member.

7. In a machine tool including a work table and a tool head support, a bed, a base adjustably attachable thereto, a frame member adjustably secured to the base, a tool head removably attached to the frame member, and a frame member above the tool head and removably attached thereto.

8. In a machine tool including a work table and a tool head support, a tool head removably attachable to the support and including a housing having oppositely arranged symmetrical flat sides, said sides including means adjacent their edges for securing the head between members of a machine frame, and means extending transversely of the housing for securing the head to the side of an upright.

9. In a machine tool including a work table and a tool head support, a bed having vertical sides, a base having a vertical wall that is attachable to the bed and adjustable endwise thereof, a tool head that is attachable to said base and adjustable thereon toward the bed, and a frame member positionable above the tool head and removably attached thereto.

10. In a machine tool including a work table and a tool head support, a self-contained tool head removably attachable to the support and including a housing of box-like formation having symmetrical opposite flat sides permitting the head to be reversibly attached to the support, and a tool positioned beyond one end of said housing and between said opposite flat sides.

11. In a machine tool including a work table and a tool head support, a self-contained reversible tool head comprising a housing having symmetrical opposite sides which are selectively attachable to said support, and a tool positioned beyond one end of said housing and between said opposite sides.

12. In a machine tool including a work table and a tool head support, a self-contained reversible tool head comprising a housing having symmetrical opposite sides which are selectively attachable to said support or positionable horizontally between upper and lower members of a vertical frame, and a tool positioned beyond one end of said housing and between said opposite sides.

WORTHY J. F. FORWARD.